United States Patent [19]
Renaud

[11] Patent Number: 4,796,524
[45] Date of Patent: Jan. 10, 1989

[54] METHOD AND APPARATUS FOR WRAPPING BALES OF CROP MATERIAL

[75] Inventor: Loic Renaud, Coex, France

[73] Assignee: Hay & Forage Industries, Hesston, Kans.

[21] Appl. No.: 910,940

[22] Filed: Sep. 24, 1986

[51] Int. Cl.$^4$ .............................................. B65B 13/18
[52] U.S. Cl. .......................................... 100/3; 100/5; 100/13
[58] Field of Search ...................... 100/3, 5, 13, 15, 88; 56/343, 341

[56] References Cited

U.S. PATENT DOCUMENTS

| | | | |
|---|---|---|---|
| 3,894,484 | 7/1975 | Anstey | 100/13 X |
| 4,248,143 | 2/1981 | Gaeddert | 100/13 X |
| 4,505,197 | 3/1985 | Shenberger et al. | 100/5 |
| 4,557,189 | 12/1985 | Schaible | 100/13 |
| 4,627,340 | 12/1986 | Glass et al. | 100/5 |
| 4,649,812 | 3/1987 | Mouret | 100/5 |

Primary Examiner—Andrew M. Falik
Attorney, Agent, or Firm—Hovey, Williams, Timmons & Collins

[57] ABSTRACT

A crop baler for producing rolled cylindrical bales prevents crumbling of the ends of the bale by positioning two twine guide tubes to simultaneously initiate wrapping at two positions slightly inboard of the bale ends, moving the twine guide tubes in opposite directions out to the ends, and then moving the twine guide tubes simultaneously back toward the center of the bale for completion and severance of the twine. The baler includes a positive feeding device for temporarily advancing a sufficient length of twine through the guide tubes at the beginning of the wrapping cycle to permit the rotating bale to grab the twine and pull the remainder of the twine from the tubes as the cycle continues. A control box moves the tubes along a path adjacent the periphery of the bale and parallel to the longitudinal axis of the bale.

21 Claims, 6 Drawing Sheets

METHOD AND APPARATUS FOR WRAPPING BALES OF CROP MATERIAL

BACKGROUND OF THE INVENTION

1. Field of the Invention

The present inventuon relates to a method for wrapping bales of fibrous crop materials in a pick-up baler in which cylindrical bales are formed from windrowed fibrous crop materials. When a bale is completed, the free end of a binding twine is projected onto the periphery of the bale by means of a twine-feeding and guiding device. The twine is then hooked onto the bale and is helically wound under tension around the bale while the twine-feeding and guiding device moves at constant speed in parallel to the axis of the bale so as to wrap the whole cylindrical periphery of the bale with the twine. The twine is later cut at the end of the wrapping operation in the median zone of the bale periphery.

2. Related Art

Many of the conventional devices (such as the one in French Pat. No. 2 518 263) have one particular disadvantage which is to leave the ends of the bale unwrapped for a not inconsiderable period of rotation, during which the ends become loose and crumble, thereby causing the twine to become relatively slack in those parts. The loose hay and twine interfere with the operation of the baler.

According to the known method, wrapping of the bale begins in the longitudinal center of the bale periphery, moving toward one end of the bale, and then reversing the direction of movement of the twine-feeding and guiding device, toward the other end of the bale, and then returning toward the starting point of the operation at the first end of the bale. Understandably, with this type of system, one half of the bale is left completely unwrapped for a period of time while during that same period of time the other half of the bale is wrapped twice over. Moreover, the time required to wrap the bale is quite long since for every wrapping operation the twine feeding and guiding device has to move twice along the length of the cylindrical bale.

To overcome these disadvantages, it has already been proposed to deposit the twine on the bale periphery by means of two twine-guiding tubes, of which one end is mounted for pivoting in the axis of the installation, namely in extension of the mediam plane of the bale which is perpendicular thereto, while the other end through which the twine is deposited, sweeps an arc-forming area above the bale which extends from one end of the bale cylindrical periphery to the other. In this case, the binding operation begins at one end of the bale and stops at the other before the twine is cut. When, in such a case, two twine-guiding tubes are used simultaneously, these tubes pivot in opposite directions so that the two ends of the bale are wrapped right from the start of the operation and crumbling of the ends is prevented. The wrapping time, on the other hand, is still quite long and the spacings between two adjacent twine windings vary from one spacing to the other, due to the pivoting movement of the twine-guiding tubes.

SUMMARY OF THE INVENTION

It is the object of the present invention to propose a wrapping method of the type mentioned initially, permitting the rapid and correct wrapping of bales at regular spacings.

This object is reached according to the invention due to the fact that wrapping is simultaneously started in the two end zones of the bale periphery, first on the inside of each end zone at sufficient distance from the edge to prevent crumbling of the bale, and then on the outside of said end zone, then the two halves of the bale are simultaneously wrapped, starting from the ends, by moving the two twine-guides and their twines, at constant speed, one towards the other and in parallel to the axis of the bale, the transversal displacement of the two twines in parallel to the axis of the bale being stopped when the twine-guides have moved towards each other opposite the median zone of the bale, and two sets of several circular windings of twine being made before the twines are cut.

Thus, a correctly wrapped bale is obtained in a very short time, which reduces the successive stoppings of the movable press used for wrapping the cylindrical bales.

Another object of the invention is a pick-up baler for producing cylindrical bales, equipped with an installation for binding said cylindrical bales.

The pick-up baler to which the binding installation is combined comprises a support chassis borne by a pair of wheels, a pressing chamber defined by a front housing rigidly secured on the chassis and by a rear door mounted for pivotal movement on the housing in such a way as to be pivoted upwardly and to clear a way out for a bale. At the lower part of the pressing chamber is provided an access opening which extends over the entire width of the pick-up bales in parallel to the axis of the cylindrical bale, and under said access opening is placed a feeding device also called pick-up, which gathers the windrowed fibrous materials and conveys them into the pressing chamber. Inside said pressing chamber are provided a plurality of endless belts which pass over a number of return rollers, some of which are mounted in a fixed position at the periphery of the chamber while the others are mounted on rocking arms, thus causing the belts to follow the increasing shape of the bale, a bale initiating roller being placed above and at a certain distance from the feeding device and defining the front edge of the access opening.

The wrapping installation is of the type comprising a control box situated at the lower part of the fixed housing of said pick-up baler before the opening giving access to the pressing chamber thereof, in such a way as to extend in parallel to and over the whole transversal length of said opening, at least one twine-feeding and guiding device, the feeding end of which moves in parallel to the axis of the bale and to the longitudinal edges of the access opening, means for moving the twine-feeding and guiding device in a straight path, means for feeding twine from a reel situated in a case provided on the fixed housing and equipped with a number of guide and return elements, as well as means for cutting the twine at the end of the binding operation.

Said wrapping installation is characterized in that, according to the invention, it comprises two twine-feeding and guiding devices, each one of which is constituted by the free back end of a guide-tube which extends perpendicularly to the control box, is fast by its front end with one element of the straight moving means provided in the control box, and which is adapted to move simultaneously with the other guide-tube, the two guide-tubes moving either one towards the other until they meet in the median part of the bale, or apart to return to their outermost storing position next to the side walls of the fixed housing, in that the free end of each guide-tube comprises a cutting device for cutting the twine of the other guide-tube at the outlet therefrom and in that the front end of each guide-tube is operationally coupled to a twine-feeding device.

The wrapping installation according to the invention is of simple and efficient design, and produces in a short time, correctly wrapped cylindrical bales.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
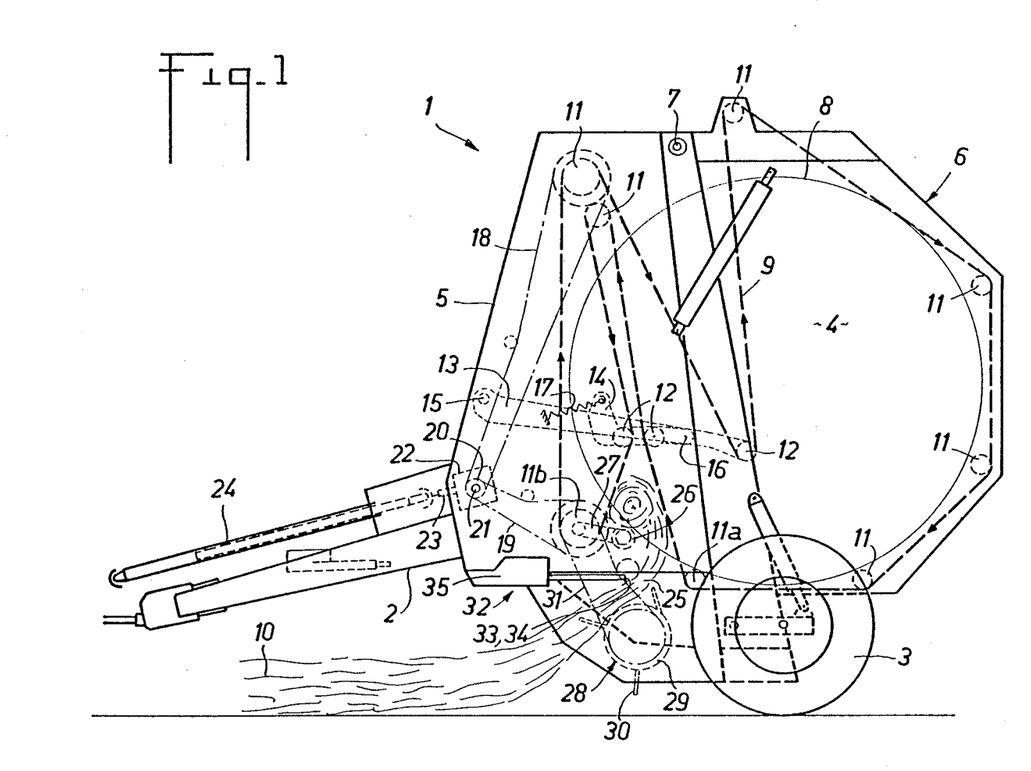
FIG. 1 is a diagrammatical elevational view of a longitudinal section of a pick-up baler, which is also known as a cylindrical bale press.

As illustrated in FIG. 1, the pick-up baler or cylindrical bale press 1 comprises, on a suppport chassis 2 borne by a pair of wheels 3, a pressing chamber 4 defined by a front housing 5 rigidly mounted on the chassis 2 and by a box-like rear door 6 mounted for pivoting by means of a pin 7 on the rear upper part of the fixed housing 5, in such a way as to be upwardly pivotable and allow the discharge of a wrapped bale 8 out of the pressing chamber 4.

A set of endless belts 9, juxtaposed and used for continuously moving and rolling windrowed fibrous crop materials 10 in order to form a cylindrical bale 8, pass around a plurality of fixed guide or return rollers 11, and around a set of position-varying rollers 12 and mounted on rocking arms 13, 14 which arms are hinged (in 15) either on the front part of the front housing, or (in 16) on the first rocking arm, and biased by a spring 17 against the first rocking arm 13.

The two fixed front rollers 11 are used together for controlling the belts 9 and are driven in rotation by two chain drives 18, 19 engaging on toothed wheel 20 of an output shaft of a transmission box 22, of which the input shaft 23 is connected via a telescopic arm with universal joints 24 to the output shaft (not shown) of a tractor.

At the lower part of the pressing chamber 4, there is provided an access opening 25 defined by a lower fixed roller 11a and a bale initiating roller 26 situated close to the lower control roller 11b and driven in rotation from the latter via another chain drive 27. Understandably, the different drives are so arranged as not to interfere with the feeding of the windrows 10 to the access opening 25 which extends over the entire width of the machine 1 in parallel to the axis of the bale 8 and to all the rollers 11 and 12.

A feeding device 28 of conventional design, and known as a pick-up is provided under the access opening. Said feeding device 28 comprises a cylinder 29, movable in rotation and mounted on the lower part of the front housing 5, said cylinder being equipped with a set of pick-up fingers 30 and a belt drive 31 rotating the said cylinder 29 synchronously with the lower control roller 11b.

The wrapping installation 32 comprises two twine-guide devices 33, 34 and is mounted at the lower part of the front housing 5 in such a way that the free rear end of the twine-feeding device 33, 34 is situated above the feeing device 28, under the bale initiating roller 26 and in front of the access opening 25.

Figure 2:
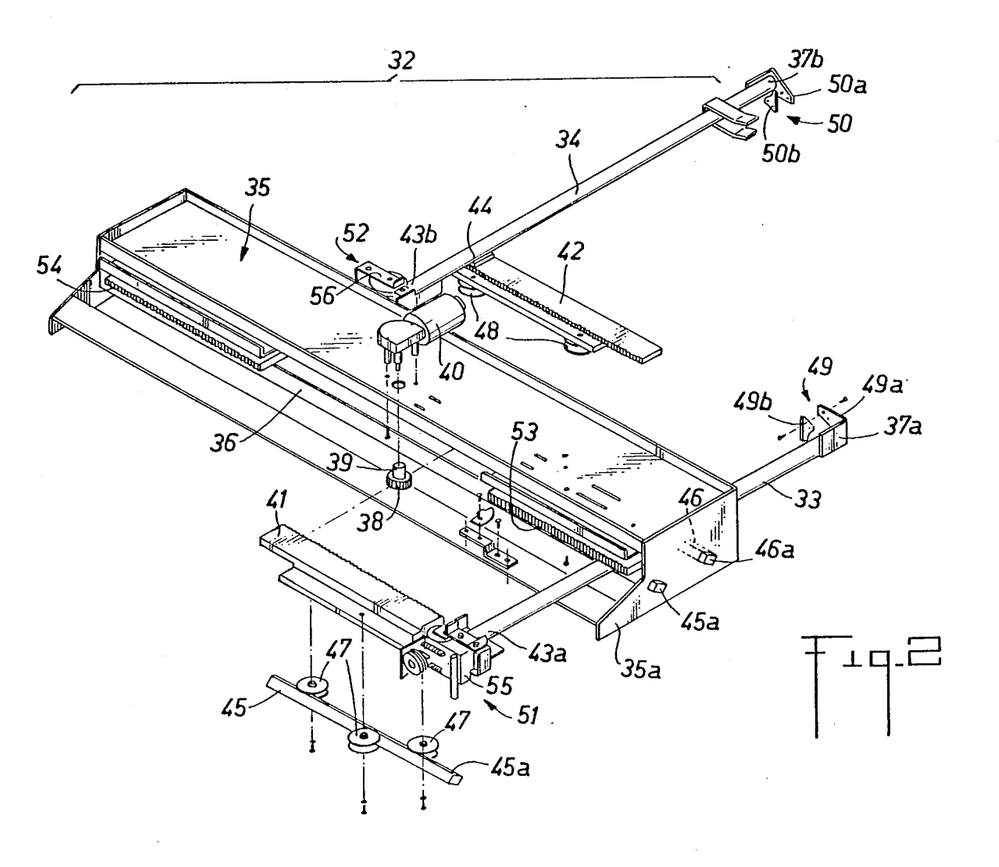
FIG. 2 is a partly exploded perspective view of the wrapping installation.

As particularly illustrated in FIG. 2, the binding installation 32 comprises a control box 35 situated at right angle to the lower part of the fixed housing 5 and in parallel to and at the front of the access opening 25, and extending through the entire width of the pick-up baler 1.

The control box 35 is provided on its front face and on its back face with a through slot 36 traversed by the front end-parts of two twine guide-tubes, each one of which constitutes one of the two twine feeding and guiding devcie 33, 34 situated on the same level, just in front of the access opening 25 above feeding device 28 and under the bale initiating roller 26.

In the center of the box 35 is provided a central toothed wheel 38, the vertical shaft 39 of which is actuated in rotation by an electric motor 40 mounted on said box 35. Said central toothed wheel 38 cooperates with two movable transverse racks 41, 42 of length slightly greater than half that of the box 35. Each of said movable racks 41, 42 extends in parallel to the other and to the access opening 25 and perpendicularly to each of said guide-tubes 33, 34. The external side end of each movable rack 41, 42 is secured either to the front end 43a, 43b of one (33) of the guide-tubes 33, 34, or to a part 44 of the guide-tube (34) standing back slightly from the front end (for example 43b) thereof, in order to allow said movable racks to be positioned on either side of the central toothed wheel 38 and to move in opposite directions when said toothed wheel is rotating.

To prevent any interference with one guide-tube 33 or 34 by the movable rack 42 and 41 integral with the other guide-tube 34 or 33, the two racks 41, 42 are shifted, heightwise, of a distance equal to the external diameter of the guide-tubes 41, 42 and are fixed, one (for example 41) on the top of its corresponding guide-tube 33, and the other on the underpart of its guide-tube 34. Each movable rack 41, 42 is guided along a guide rail 45, 46 for example of square cross-section and mounted by its two ends 45, 46a in the side walls 35a of the box 35, with the help of three rollers 47 or 48 the pivot pins of which are fast with the corresponding rack 41 or 42 and which rest either on one side or on the other of the rail 45 or 46.

At the free back end 37a, 37b of each guide tube 33, 34 is provided a cutting device 49, 50 which comprises a blade support 49a, 50a and a blade 49b, 50b for cutting the twine coming out of the free end 37b, 37a of the other guide-tube 34, 33, which blade is fixed by its outer end on the blade support 49a, 50a so that its inner end extends towards the free end 37b or 37a of the other guide-tube 34 or 33 and passes in front of the free end 37b or 37a when the two guide-tubes 33, 34 are in close-together position (see FIG. 8); thereagain, the cutting blades 49b, 50b are so placed on the blade supports 49a, 50a as to be able to intersect without any interference during the cutting of the stretched twines 61, each one of the blade supports 49a, 50a being rigidly mounted on the free back end 37a, 37b of the corresponding guiding tube 33 or 34, without impeding the passage of the binding twine 61.

Figure 3:
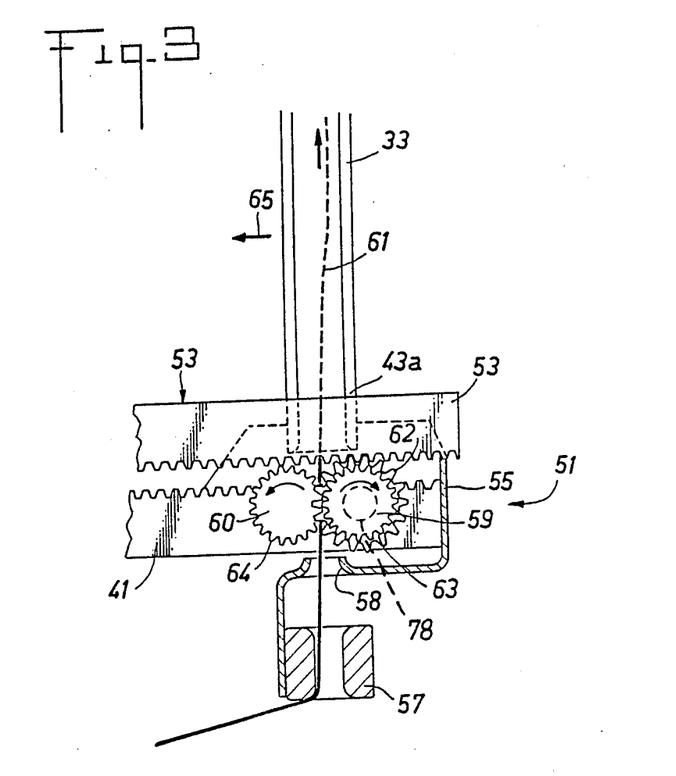
FIG. 3 is a diagrammatical plan view of the twine-feeding device.

At the front end 43a, 43b, each guide-tube 33, 34 is coupled to a twine feeding device 51, 52 illustrated in FIGS. 2 and 3. Each feeding device 51, 52 comprises a fixed rack 53, 54 placed inside the box 35, for example, above the external path of the front end 43a or 43b of the guide-tube 33 or 34. These fixed racks 53, 54 extend from the corresponding side wall 35a towards the center of the box 35 over a distance not exceeding one quarter of the transverse length of said box 35. The feeding device 51, 52 further comprises, in front of the front end 43a, 43b of each guide-tube 33, 34 on a support 55, 56 integral with said corresponding end 43a or 43b, from the front to the back, two twine-guiding eyelets 57, 58 and a pair of pressing rollers 59, 60 between which the twine 61 is more or less strongly gripped, said twine, which comes out of the two twine-guiding eyelets 57,58, passing between the two pressing rollers 59, 60 before entering the front end 43a, 43b of the corresponding guide-tube 33 or 34 and going right through it.

One, for example 59, of the pressing rollers 59, 60 carries a crown wheel 62 meshing with the corresponding fixed rack 53, 54, as well as a toothed wheel 63 fast with said roller 59 and cooperating with a toothed wheel 64 integral with the other pressing roller (for example 60). The crown wheel 62 is connected to the coaxial toothed wheel 63 and to the corresponding pressing roller 59 (or 60) via a free wheel mechanism 78, which couples the crown wheel 62 to the corresponding pressing roller 59 only when the corresponding guide-tube 33 or 34 and with it the pairs of pressing rollers 59, 60, moves (in the direction of arrow 65) from the outside towards the center of the box 35 and causes, as a result, the crown wheel 62 to turn (clockwise in the example illustrated in FIG. 3) and the forward feeding of the twine 61 between the pressing rollers 59, 60 of a predetermined length (for example 30 cm) in the direction of the free rear end 37a or 37b of the corresponding guide-tube 33, 34.

The wrapping installtion 32 works as diagrammatically illustrated in FIGS. 4 to 8 and as explained hereunder.

Figure 4:
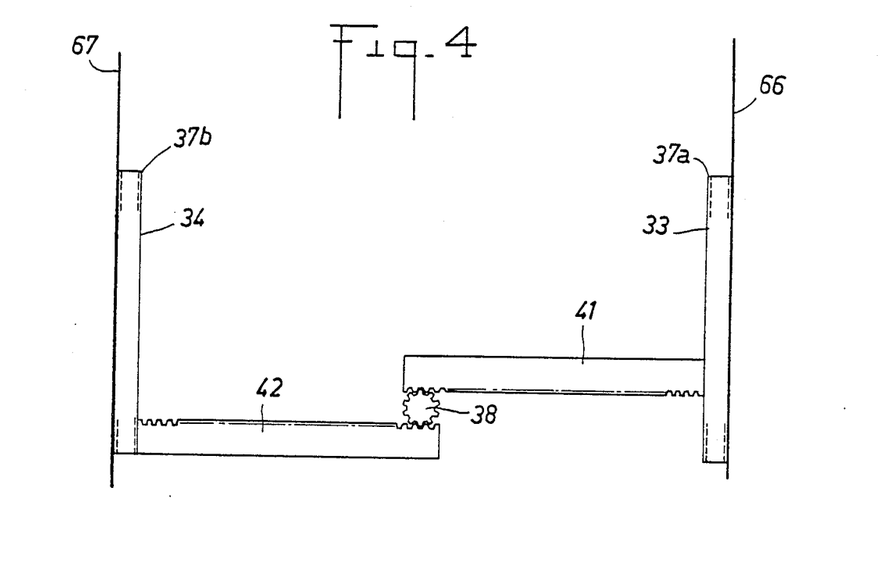
FIGS. 4 to 8 are plan views showing some of the movable elements of the wrapping installation in various working positions and in lateral storage position.
Figure 5:
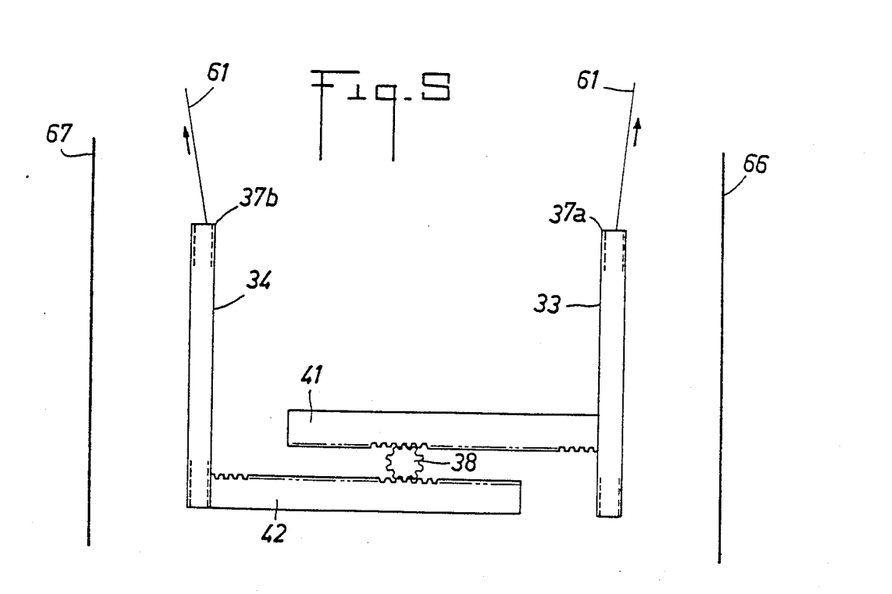

When the windrowed material 10 has been rolled into a bale 8 of a given diameter, the guide-tubes 33, 34 are moved towards each other from their storage position along the side walls 66, 67 of the pick-up baler by means of the central toothed wheel 38 which actuates the corresponding movable racks 41, 42, the free end of the twine 61 hardly projecting, if at all, from the free rear end 37a, 37b of the guide-tube 33 or 34 (see FIG. 4).

During their displacement, the guide-tubes 33, 34 are both moved to about 30 cm from the side walls 66, 67 (see FIG. 5) defining at the same time the ends of the bale 8. During this displacement, the crown wheel 62 of the feed device 51, 52 rolls over the fixed rack 53 or 54 and transmits its rotation to the pressing rollers 59, 60 which cause the twine 61 to move forward of 20 to 30 cm, reaching for example beyond the free end 37a, 37b of the guide-tube 33 or 34 and introduce it into the pressing chamber 4 or onto the feeding device 28 which projects it into said chamber 4. The end of each twine 61 is caught by the bale 8 which turns inside the chamber 4 under the action of the belts 9. Once the twine 61 is caught and hooked to the bale 8, for example by turning the bale for half-a-turn, the guide-tubes 33, 34 are moved in the direction of the adjacent side walls 66, 67 with the control wheel 38 and the movable racks 41, 42 and they are stopped at about 13 to 15 cm from said walls in order to wrap simultaneously the two ends of bale 8 (position shown in FIG. 6) by several circular turns of twine 66 on the rotating bale 8, the pair of pressing rollers 59, 60 acting as a brake for the twine under the pulling force exerted by the rotating bale 8 on the two twines 61. This creates inside each one of the two end zones 69a, 69b of the bale 8, an internal wrapping 70a, and an external circular wrapping 70b of several windings joined with the internal binding 70a, which may be less than one winding of twine, by an intermediate helical winding 70c.

Figure 6:
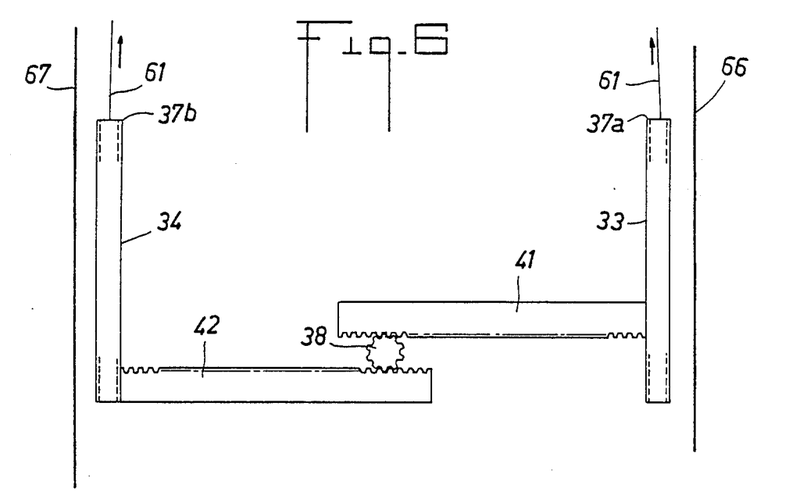
Figure 7:
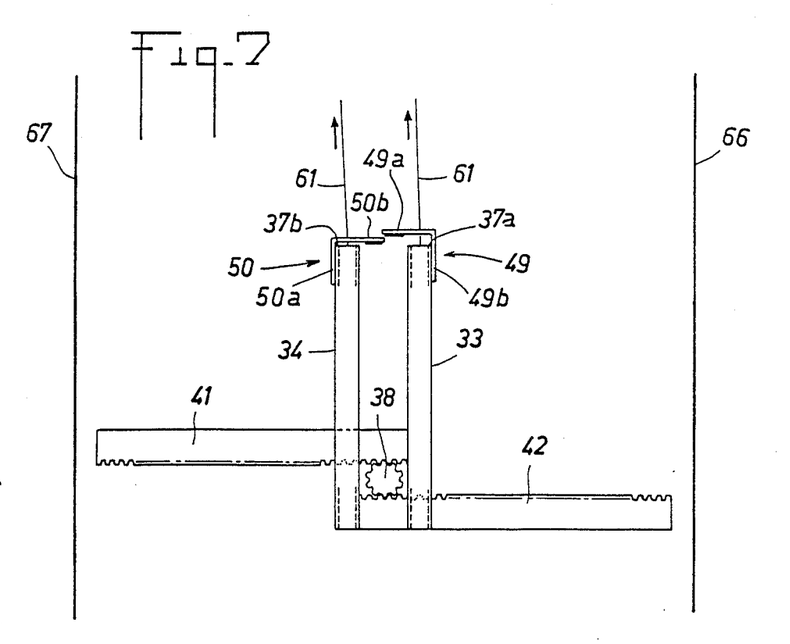

Immediately after, the two guide-tubes 33, 34 are moved in a straight line and at constant but adjustable speed, towards the center of the periphery of the bale 8. As a result of the two guide-tubes coming close together, the two twines are wound under tension around the bale 8, forming helical windings 71a, 71b with constant and equal spacings between them, but reversedly inclined one with respect to the other, each twine being wound several times around the bale 8.

The movement approaching the guide-tubes 33, 34 towards each other, is stopped when said guide-tubes are separated only by 10 to 20 cm. Thereagain, the rotation of the bale 8 continues and each of the twines 61 is wound several times (72a, 72b) around said bale (FIG. 7) thereby forming two sets (72a, 72b) of several sircular windings of twine.

Figure 8:
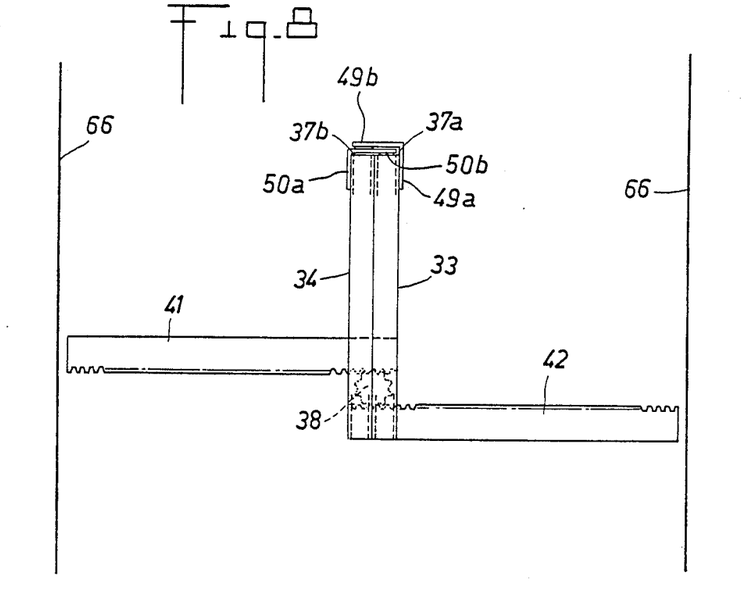
Figure 9:
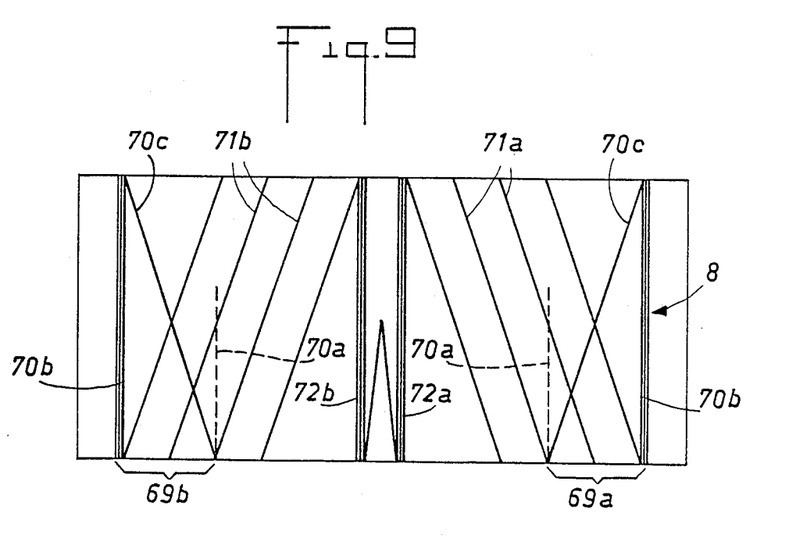
FIG. 9 is a plan view of a bale wrapped according to the invention.

After a minimum number of windings of the twine to obtain a correct wrapping, the guide-tubes 33, 34 are moved towards each other so that the blade 49a or 50b of one (33) or the other (34) of tubes 33, 34 can cut the stretched twine 61 coming out of the other guidetube 34 or 33 (FIG. 8).

Thereafter, the two guide-tubes 33, 34 are moved away one from the other and returned to their respective storage position (FIG. 4) until the next bale wrapping operation.

What is claimed as new and desired to be secured by Letters Patent of the United States is:

1. In a method of wrapping bales of fibrous crop materials in a pick-up bales inside which cylindrical bales (8), having longitudinal axis, a median zone, two end zones, and two longitudinal halves, are formed from windrowed fibrous crop materials (10), and of the type in which, when a bale (8) is completed, the free end of a binding twine (61) is projected onto the periphery of the bale (8) by means of a pair of twine guiding devices (33,34), the improvement comprising the steps of helically winding the twine under tension around said bale while moving the guiding devices (33,34) at constant speed in parallel to the axis of the bale (8) so as to wrap the whole cylindrical periphery of the bale with the twine, which later is cut at the end of the wrapping operation in the median zone of the bale periphery; simultaneously starting wrapping of said bale in the two end zones of the bale periphery, first on the inside (70a) of each end zone (69a, 69b) at sufficient distance from the edge to prevent crumbling of the bale, and then on the outside (70b) of said end zone; continuing wrapping by simultaneously wrapping the two halves of the bale, starting from the end zones, and then mixing the two twine-guides (33,34) and their twines (61), at constant speed, one towards the other and in parallel to the axis of the bale (8), the transversal displacement of the two twines (61) in parallel to the axis of the bale (8) being stopped when the twine-guides (33,34) have moved toward each other opposite the median zone of the bale (8); two sets (72a,72b) of several circular windings of twine being made before the twines are cut (61); and cutting said twine.

2. Method as claimed in claim 1, wherein wrapping of the bale (8) begins on the inside of each end zone (69a,69b) at about 30 cm from the ends of the bale (8), followed by wrapping of the external part of said end zones, at about 15 cm from the ends of the bale, by making thereon several circular windings (70b) of twine.

3. A pick up baler for rolling a cylindrical bale having a longitudinal axis and a median part, said baler comprising:
   a fixed housing having side walls;
   structure defining a pressing chamber and an elongated, transversely extending access opening providing access to the chamber;
   a control box extending parallel to and substantially over the whole transversal length of said opening;
   a pair of twine-feeding and guiding devices each including a guide tube extending in a direction substantially perpendicular to said control box, each of said tubes having a free-feeding end,
   said devices each including means for feeding twine through the feeding end of the corresponding guide tube;
   means for moving said feeding ends of the twine-feeding and guiding devices in a generally straight path substantially parallel to the longitudinal axis of said bale and to the tranverse length of said access opening,
   said moving means including a pair of elements in said control box,
   said moving means including means for simultaneously moving the guide tubes toward each other to a meeting position adjacent said median part of the bale, and for simultaneously moving the tubes away from each other to respective, outermost storing positions next to said side walls of the housing,
   said feeding end of each guide tube including a cutting device for cutting twine fed through the end of the other guide tube by the corresponding twine feeding means.

4. In the pick-up baler as calimed in claim 3, wherein the moving means comprise two movable rack elements (41,42), each one of which extends and is guided in parallel to the opening (25) giving access into the pressing chamber (4) of the pick-up baler, said opening having a length slightly greater than that of the box (35), each of said elements having an external lateral end supporting the corresponding guide-tube (33 or 34), and cooperating with a common central toothed wheel (38) of the box (35) so as to move in the opposite direction to that followed by the other movable rack during the rotation of said central toothed wheel.

5. In the pickup baler as claimed in claims 3 or 4, wherein said cutting device (49,50) comprises a cutting blade (49b, 50b) having an internal end and an external end, said cutting blade being fixed by its external end of a blade support (49a, 50b) which is rigidly mounted on the free rear end (37a, 37b) of the corresponding guide-tube (33,34), and said cutting blade extending by its internal end toward the free rear end (37b,37a) of the other guide-tube (34 or 33), and passing in front of said free end (37a, 37b), when the two guide-tubes (33,34) are in said meeting position.

6. In the pick-up baler as claimed in claim 3, wherein each twine feeding device (51,52) comprises a fixed rack placed inside the box (35) as well as on a support (55,56) integral with the front end 43a, 43b of the guide-tube (33,34), at least one twine-guide (57,58) and a pair of pressing rollers (59,60) between which the twine (61) is gripped, one of said rollers bearing a crown wheel which meshes with the corresponding fixed rack (53 or 54) and is joined to said roller (59) via free wheel mechanism achieving the connection between said crown (62) and the corresponding roller (59) only when the corresponding guide-tube (33 or 34) moves the outside towards the center of the box toward said meeting position.

7. In a baler for rolling a cylindrical bale including means for rotation of said bale, a twine guiding device movable along the length of the bale during rotation thereof for wrapping the bale with twine from a source of supply, and cutter means for severing the wrapped twine from the source of supply after the bale has been wrapped and for leaving a free terminal end portion of the severed twine on the guiding device, the improvement comprising:
   means for initially feeding a sufficient length of twine from said twine guide device to said bale to permit said bale to catch the twine during rotation of said bale and thereby initate wrapping of said bale,
   said terminal end portion of the twine being free to move with the device during said initial feeding of the twine, and said temporary feeding means being the means by which the twine is fed from the device until the bale itself begins to pull twine from the device, whereupon the bale completes the feeding of twine from the device, said temporary feeding means including means for drivingly engaging the twine to effect said initial feeding thereof.

8. The invention as set forth in claim 7, wherein said twine guiding device includes a tube which receives the twine, said means for drivingly engaging the twine to effect said initial feeding being operable to push the twine in an axial direction through the tube.

9. The invention as set forth in claim 8, wherein said guide tube presents a feeding end, and wherein said means for drivingly engaging the twine to effect said initial feeding is disposed in a position upstream and remote from said feeding end of the tube with respect to the direction of movement of the twine through the tube.

10. In a baler for rolling a cylindrical bale having a longitudinal axis, said baler having means for rotation of said bale and having a twine guiding device for guiding twine along the length of said bale, the improvement comprising:
   means for automatically feeding twine from said twine guide device to said bale in order to provide a sufficient length of twine for said bale to catch during rotation of said bale and thereby initiate wrapping of said bale;
   means for cutting said twine following completion of wrapping of said bale, said twine being cut at a length of insufficient to permit subsequent initiation of wrapping of said bale; and
   means for moving said twine guide along a path parallel to the longitudinal axis of said bale, said twine feeding means being disposed to feed twine in response to movement of said guide along said longitudinal axis.

11. In the baler as claimed in claim 10, wherein said bale includes a periphery with longitudinally outer ends and a longitudinal center, said improvement further comprising a pair of said twine guides, each twine guide having a corresponding twine; and including means for moving said twine guides in a symmetrical inwardly direction from outer storage positions adjacent the longitudinally outer ends of the periphery of said bale to the longitudinal center of the periphery of said bale.

12. In the baler of claim 11, said cutting means being disposed for cutting said pair of twines when said twine guides are adjacent the longitudinal center of the periphery of said bale.

13. In the baler as claimed in claim 10, said feeding means including a free wheel mechanism for permitting automatic feeding of said twine only in response to movement of said twine guide in one direction.

14. In the baler of claim 12, the improvement further comprising:
means for automatically feeding twine from each of said twine guiding devices to said bale, said twine feeding means being disposed for automaticaly feeding twine from said twine guides only in responce to inward movement of said twine guides.

15. In a baler for rolling a cylindrical bale having a longitudinal axis, said baler having means for rotation of said bale and having a twine guiding device for guiding twine along the length of said bale, the improvement comprising:
means for automatically feeding twine from said twine guide device to said bale in order to provide a sufficient length of twine for said bale to catch during rotation of said bale and thereby initiate wrapping of said bale,
said automatic feeding means including means for permitting said rotating bale to draw twine from said automatic feeding means at a rate greater than that provided by said automatic feeding means.

16. In a method for wrapping successive cylindrical bales with twine at a wrapping location by moving a twine guiding device along the length of each bale successively disposed at such location while issuing twine from the device as the bale is rotating, the improvement comprising the steps of:
at the conclusion of each bale wrapping cycle, severing the twine from the wrappped bale to present a free terminal end portion of the twine hanging from the guiding device adjacent the wrapping location,
said terminal end portion of the twine being of insufficient length to engage and be pulled from the device by the next blade at the wrapping location during rotation of the next bale;
at the beginning of the wrapping cycle for said next bale, feeding an initial length of twine, including said free terminal end portion thereof, from the device while the next bale is rotating until the rotating bale grips the twine and begins pulling the twine from the device; and
after the next rotating bale begins pulling twine from the device, discontinuing said feeding step and permitting the bale itself to pull twine from the device as the latter is moved along the length of the bale.

17. The method as set forth in claim 16, wherein said step of initially feeding the twine includes pushing the twine from the device.

18. A method for wrapping a cylindrical bale with twine, said method comprising the steps of:
rotating said bale;
initially using means other than the bale itself to feed from a twine guiding device a length of twine sufficient to permit said rotating bale to catch said twine; once the bale has caught the twine and started pulling the twine from the device, terminating further use of the other means and using only said rotating bale to draw twine from said guiding device; and
guiding the twine along the periphery of said bale while the bale pulls twine from the device in order to permit said rotating bale to wrap the length of itself with said twine,
said twine guiding step being initiated at an end zone of said bale.

19. A method for wrapping a cylindrical bale with twine, said bale having a longitudinal axis of rotation, said method comprising the steps of:
rotating said bale;
initially using means other than the bale itself to feed from a pair of guiding devices a corresponding pair of initial lengths of twines of sufficient length to permit said rotating bale to catch said twines, said initial lengths of twine being caught at opposite end zones of said bale;
once the bale has caught the twines and started pulling the twines from the devices, terminating further use of the other means and using only said rotating bale to draw twine from said guiding devices; and
simultaneously guiding said twines inwardly from said end zones toward the longitudinal center of the periphery of said bale while the bale pulls the twines from the device.

20. In the method of claim 19, further comprising the step of cutting said twine at the longitudinal center of the periphery of said bale.

21. In the method of claim 20, wherein said twine is cut at a length insufficient to permit said rotating bale to catch the unfed length of twine.

* * * * *